United States Patent [19]

Collot et al.

[11] Patent Number: 5,283,956
[45] Date of Patent: Feb. 8, 1994

[54] DEVICE FOR INDICATING THE AIM OF THE OPTICAL AXIS OF A REFLECTOR ON A MOTOR VEHICLE RELATIVE TO A REFERENCE DIRECTION

[75] Inventors: Patrice Collot, Pantin; Charles Wassen, Saint Barthelemy D'Anjou; Ghislaine Pinson, Villeneuve-la-Garenne; Hector Fratty, Paris; Jean-Marie Brel, Claye-Souilly; Guy Dorleans, Boulogne; Norbert Brun, Bobbigny, all of France

[73] Assignee: Valeo Vision, Bobigny, France

[21] Appl. No.: 787,394

[22] Filed: Nov. 4, 1991

Related U.S. Application Data

[63] Continuation-in-part of Ser. No. 652,436, Feb. 8, 1991, abandoned.

[30] Foreign Application Priority Data

Feb. 9, 1990 [FR] France .................. 90 01539

[51] Int. Cl.⁵ ............................................. G01B 5/25
[52] U.S. Cl. .................................... 33/288; 33/339
[58] Field of Search ....................... 33/288, 335, 339; 362/61, 66

[56] References Cited

U.S. PATENT DOCUMENTS

| | | | |
|---|---|---|---|
| 2,144,838 | 1/1939 | Falge | 33/335 |
| 2,609,611 | 9/1952 | Dickson | 33/339 |
| 3,612,854 | 10/1971 | Tood et al. | 33/288 |
| 4,110,819 | 8/1978 | Ishikawa | 362/66 |
| 4,660,128 | 4/1987 | Bergin et al. | 362/61 |
| 4,916,583 | 4/1990 | Nagasawa | 33/288 |
| 5,047,905 | 9/1991 | Collot et al. | 362/66 |
| 5,050,048 | 9/1991 | Hendrischl et al. | 362/61 |
| 5,055,980 | 10/1991 | Mochizuki | 33/288 |
| 5,056,916 | 10/1991 | Kikuchi et al. | 33/288 |
| 5,121,303 | 6/1992 | Shirai et al. | 33/335 |

FOREIGN PATENT DOCUMENTS 271484  5/1927  United Kingdom ............. 33/339

*Primary Examiner*—Thomas B. Will

[57] ABSTRACT

A device for indicating the aim, at least in bearing, of the optical axis of the reflector of a motor vehicle headlight relative to a longitudinal axis of the vehicle, wherein the device comprises apparatus for establishing a reference direction and suitable for being mounted on a fixed portion of the vehicle to define a reference direction that is well determined relative to the longitudinal axis apparatus. Apparatus is also included for establishing the direction of the optical axis of the reflector and is fixed relative to the reflector and distinct from a surface of the reflector for generating its beam. Finally, an indicator is provided for establishing the position of the optical axis direction relative to the reference direction. Indications thus given by the device enable the reflector to be adjusted after is has been mounted on the vehicle.

8 Claims, 6 Drawing Sheets

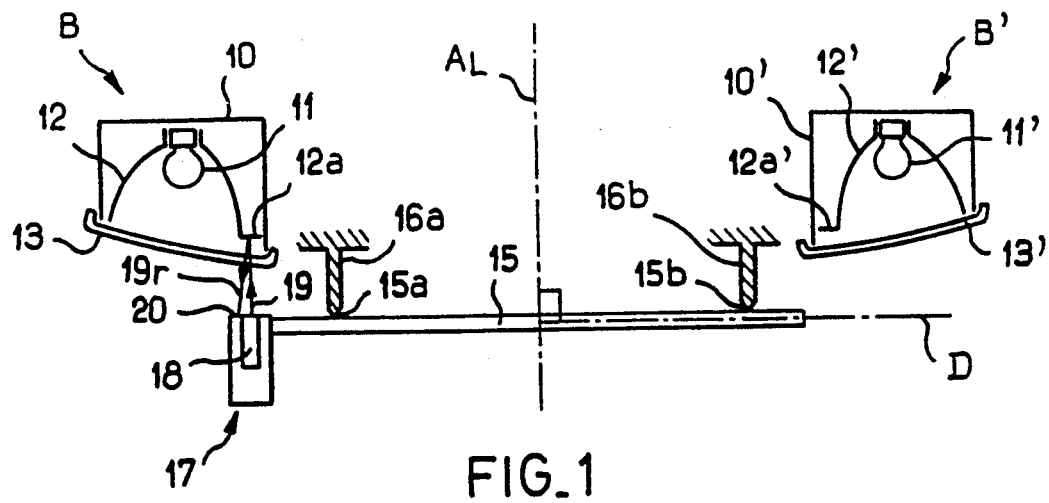
FIG._1
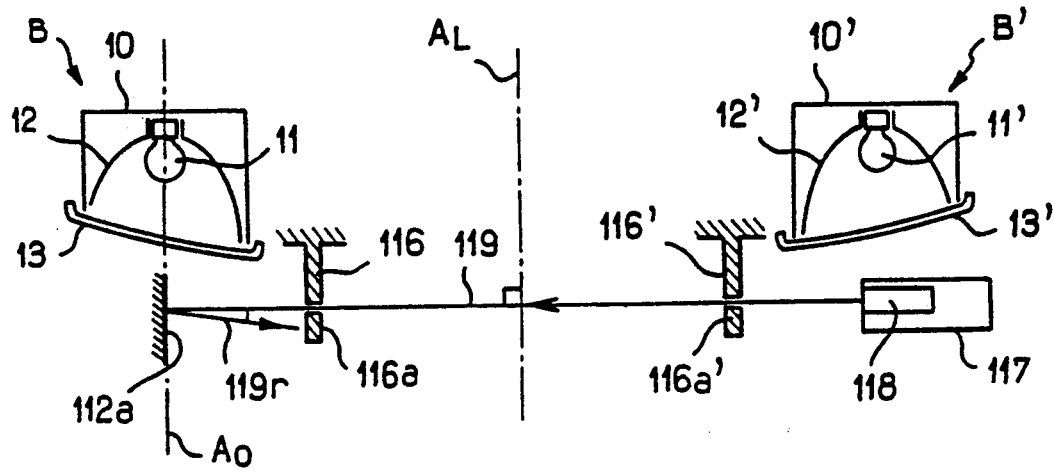
FIG._2
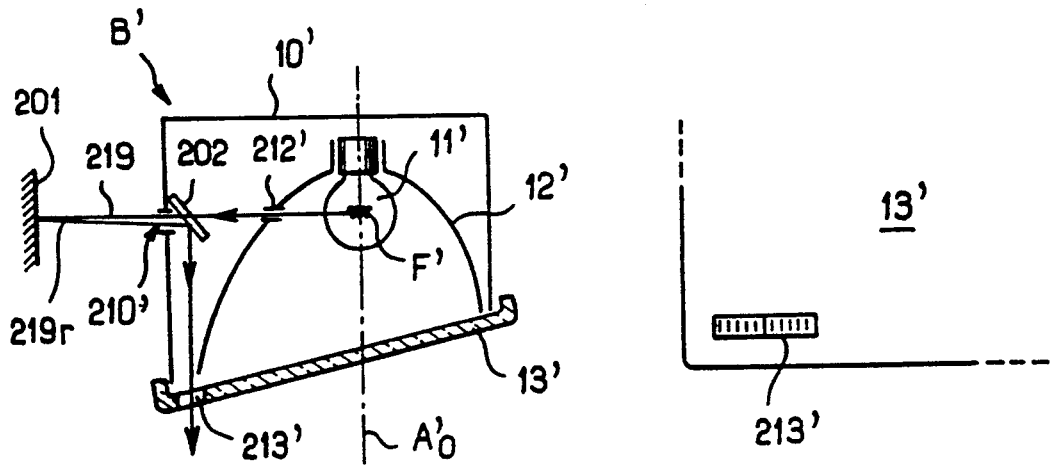
FIG._3a    FIG._3b

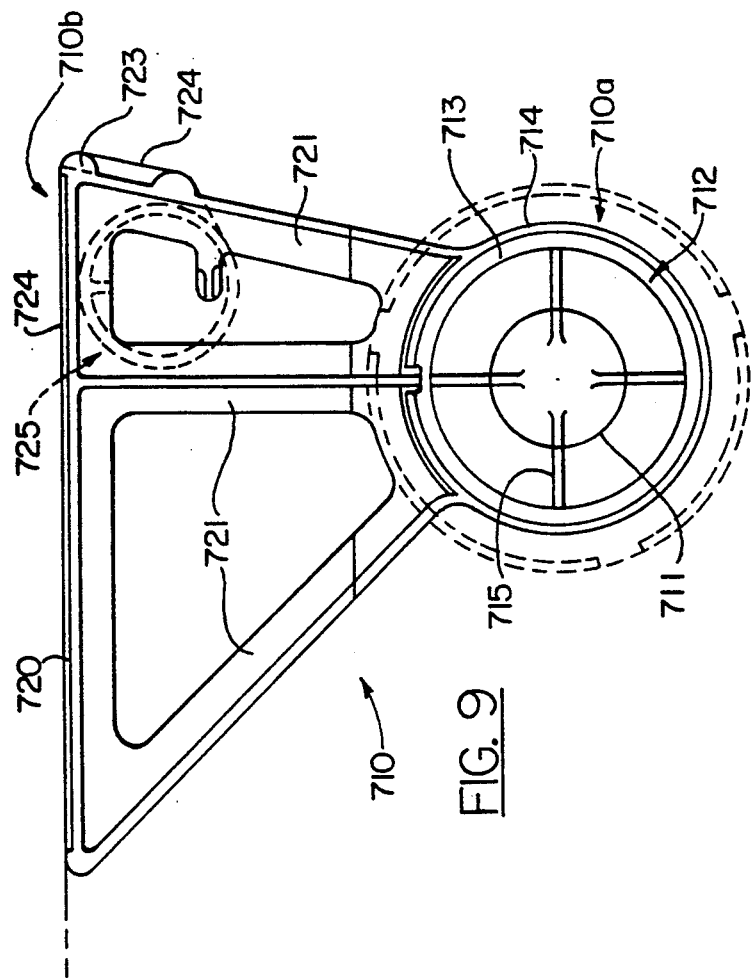
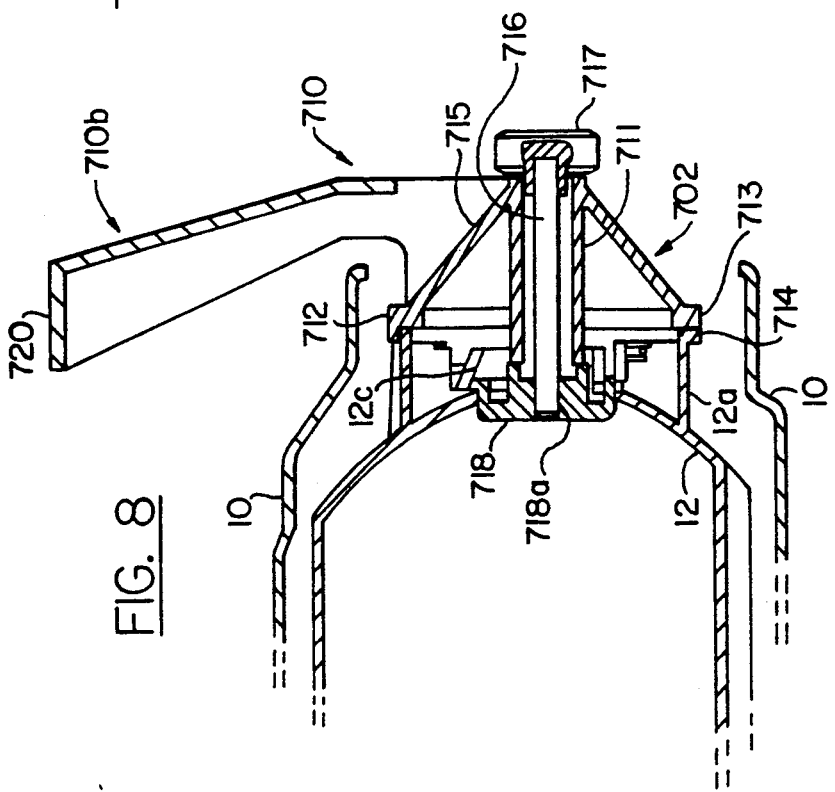

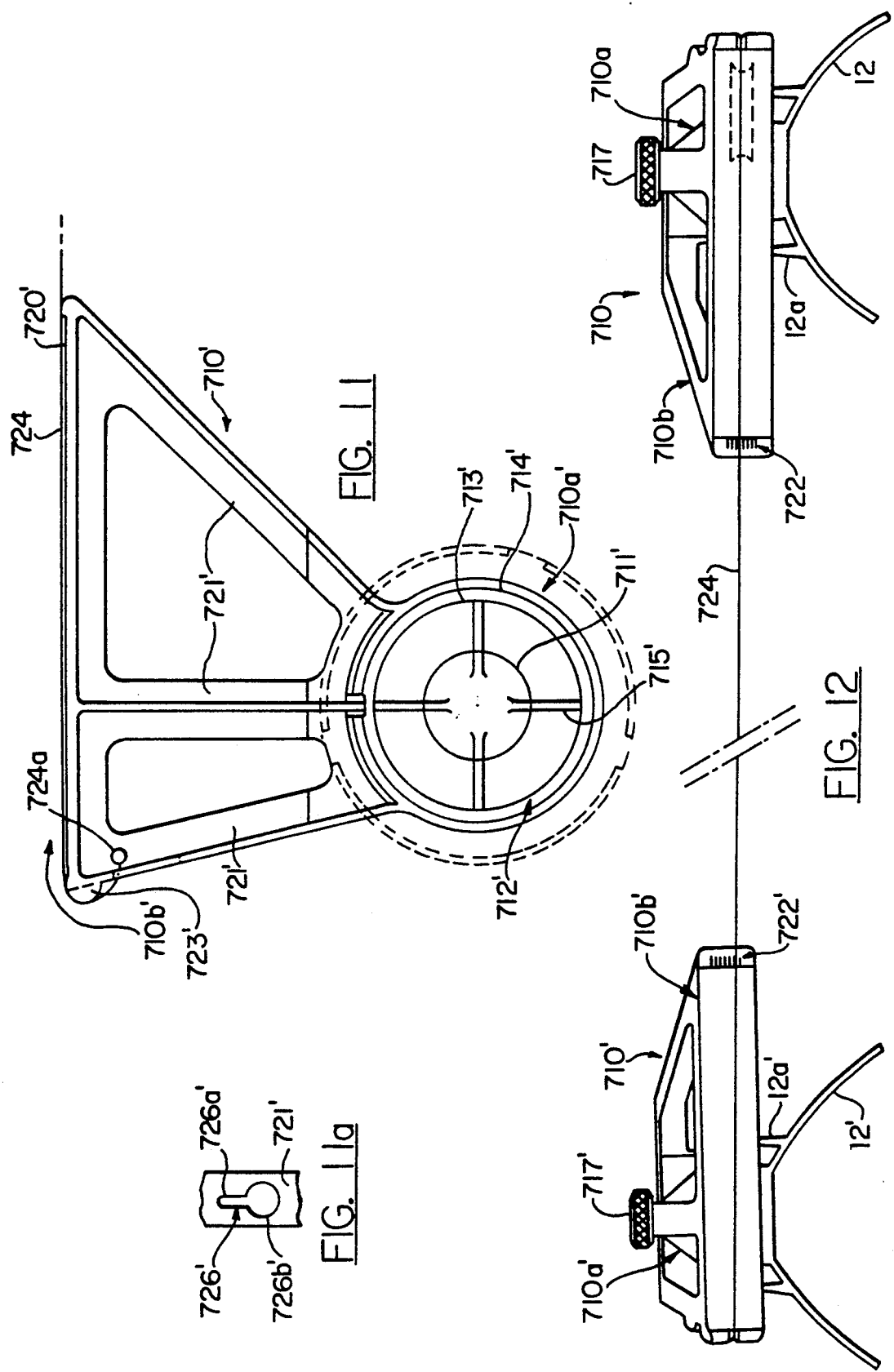

DEVICE FOR INDICATING THE AIM OF THE OPTICAL AXIS OF A REFLECTOR ON A MOTOR VEHICLE RELATIVE TO A REFERENCE DIRECTION

CROSS REFERENCE TO RELATED APPLICATION

This application is a continuation-in-part of U.S. application Ser. No. 07/652,436 filed Feb. 8, 1991, now abandoned, and entitled "A DEVICE FOR INDICATING THE AIM OF THE OPTICAL AXIS OF A REFLECTOR ON A MOTOR VEHICLE RELATIVE TO A REFERENCE DIRECTION."

The present invention relates in general to adjusting the aim of headlight reflectors on motor vehicles, and it relates more particularly to a device for indicating the aim of the optical axis defined by a reflector relative to a reference direction, thereby enabling said aim to be adjusted so as to become parallel to said reference direction.

BACKGROUND OF THE INVENTION

A certain number of indicator apparatuses already exist for adjusting the bearing and/or elevation of reflectors. In particular, U.S. Pat. No. 2,997,914 describes an apparatus suitable for mounting on the fixed glass of a headlight and of occupying a reference position, and then "reading" the beam generated by the headlight to verify that it is suitably oriented relative to the reference. The headlight is fitted with adjustment means that may be conventional or otherwise and these are used to vary the aim of the reflector and of its lamp until satisfactory beam is generated.

A characteristic common to all prior systems lies in the fact that they use light-sensitive means which are placed in the field of the light beam generated by the lamp/reflector pair that is to be adjusted, with the light-sensitive means occupying an accurate reference position. As a function of the light they receive, these light-sensitive means serve to indicate whether or not the beam is properly positioned.

All of such prior art systems are therefore disadvantageous in that they are generally complex and expensive.

The present invention seeks to mitigate these drawbacks of the prior art and to provide an aim-indicating device which is simple and cheap in design and easy to implement.

SUMMARY OF THE INVENTION

To this end, the present invention provides a device for indicating the aim, at least in bearing, of the optical axis of the reflector of a motor vehicle headlight relative to a longitudinal axis of the vehicle, wherein the device comprises:

means for establishing a reference direction and suitable for being mounted on the vehicle to define a reference direction that is well-determined relative to the longitudinal axis;

means for establishing the direction of the optical axis of the reflector, said means being fixed relative to said reflector and being distinct from a surface of said reflector for generating its beam; and indicator means for indicating the position of the optical axis direction relative to the reference direction.

In particular embodiment, the means for establishing the reference direction are mounted on a fixed portion of the vehicle.

The term "fixed portion of the vehicle" designates any portion or member thereof that remains stationary after it has been mounted, even if the mounting itself is adjustable. Thus the term includes, in particular, the headlight housings.

The present invention also provides a method of indicating the aim, at least in bearing, of the optical axis of the reflector of a motor vehicle headlight relative to a longitudinal axis of the vehicle, using a device as defined above, wherein the method comprises the steps consisting in:

performing a first aim-indicating operation;

placing a mark on a fixed portion of the vehicle in a determined position relative to means representing the reference direction as established by the device; and on each subsequent aim-indicating operation, verifying that the mark still occupies said determined position relative to the reference direction as newly established by the device.

BRIEF DESCRIPTION OF THE DRAWINGS

Embodiments of the invention are described by way of example with reference to the accompanying drawings, in which:

FIG. 1 is a diagrammatic plan view showing a first embodiment of an aim-indicating device of the present invention;

FIG. 2 is a diagrammatic plan view of a second embodiment of an aim-indicating device of the present invention;

FIG. 3a is a diagrammatic plan view showing a third embodiment of the aim-indicating device of the present invention;

FIG. 3b is a diagrammatic front view of a portion of the device shown in FIG. 3a;

FIG. 5b is a diagrammatic perspective view showing an optional detail of the device shown in FIG. 5a;

FIG. 8 is an axial vertical sectional view of a portion of a right headlight equipped with indicator means according to an eighth embodiment of this invention;

FIG. 9 is a front elevation view of the indicator means shown in FIG. 8;

FIG. 11 is a elevation view from the rear of an indicator means provided on the left headlight of the vehicle;

FIG. 11a is an elevation view of a detail of indicator means shown in FIG. 11;

FIG. 12 is a top plan view of the whole indicator means of the eighth embodiment.

DETAILED DESCRIPTION OF PREFERRED EMBODIMENTS

Figure 4:
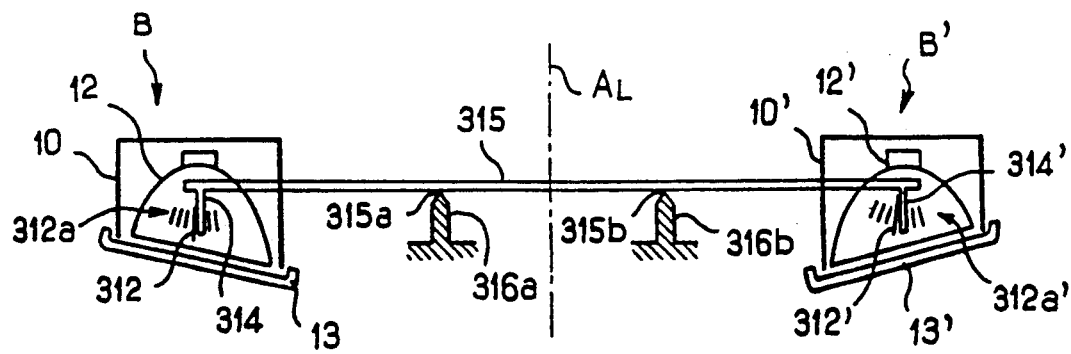
FIG. 4 is a diagrammatic plan view showing a fourth embodiment of an aim-indicating device of the present invention.

As a preliminary point, it should be observed that items or parts which are identical or similar from one figure to another are designated therein by the same reference numerals and are not described again.

With reference initially to FIG. 1, left and right optical blocks B and B' are shown, each comprising a housing 10,10', a lamp 11,11', a reflector 12,12', and a transparent closure glass 13,13'.

The housings 10,10' and the glasses 13,13' are mounted in fixed manner on the vehicle, whereas the reflector/lamp optical assemblies are mounted so as to be capable of pivoting about two essentially perpendicular axes for the purpose of performing bearing and elevation adjustments on the beam.

The regulations in force in the United States of America, for example, specify that the aim of the light beam delivered by each headlight must be determined when the headlight is mounted relative to reference planes or directions which are physically related to the vehicle. In particular, the reference center or optical axis of the beam must be centered with narrow tolerance on an axis extending in the longitudinal direction of the vehicle and parallel to the ground on which it stands.

In this first embodiment, each reflector 12,12' includes integrally molded therewith an auxiliary plane mirror 12a,12a' having a plane surface whose normal vector is parallel to the optical axis defined by the reflector. Such characteristics are relatively easily obtained at low cost during the process of molding reflectors.

For example, the plane mirror 12a,12a' may be disposed on the inside front edge of the reflector 12,12' as shown. Any other disposition is nevertheless possible.

A rigid reference bar 15 bears at two reference points 15a and 15b against two reference abutments 16a and 16b which are fixed to the vehicle at locations such that when the bar 15 bears against them in this way its orientation D is accurately perpendicular to the longitudinal axis $A_L$ of the vehicle and parallel to the ground plane.

At one of its ends, the bar carries an optical device 17 which includes a light source 18 capable of delivering a narrow light beam or pencil 19 which is directed horizontally and perpendicularly to the direction of the bar 15, i.e. parallel to the longitudinal direction of the vehicle. The optical device 17 also includes an optical receiver 20 which is constituted in a basic version by a series of graduations marked on a surface 20 of the device 17 facing the reflected beam, and having its zero in alignment with the axis of the pencil beam 19. In practice, the transmitted pencil beam 19 may pass through a small hole provided level with the zero.

In a variant (not shown), the optical receiver may be in the form of a photoelectric cell whose detection axis is superposed on the emission axis of the pencil beam 19. Such superposition may be obtained, for example, by a semitransparent mirror at an angle of 45°, with the source 18 then emitting sideways towards the mirror.

In order to adjust the reflector/lamp assembly relative to the reference, the bar 15 is put into place on the abutments 16a and 16b and the source 18 is switched on. So long as the reflected beam 19r does not coincide with the transmitted beam 19, then the optical axis of the reflector is not properly in alignment with the longitudinal axis of the vehicle. Use is then made of conventional reflector aim adjustment means (not shown for reasons of clarity) to vary the aim of the optical axis in bearing and/or in elevation until the optical receiver 20 receives the reflected beam (on its zero when using graduations or on its cell when using the above-mentioned variant). The optical axis is then in alignment.

It should be observed that the above-described device serves to provide an adjustment in bearing, in elevation, or in both.

The aim of the other headlight is adjusted by reversing the position of the bar 15 and of the optical device 17 to bring the optical device face to face with the reference mirror 12a' of the reflector of said other headlight.

In an improved version of the device (not shown), the optical receiver may be designed to deliver information representative of the angular error between the transmitted pencil beam 19 and the reflected beam 19r. For example, the receiver may be constituted by an array of individual photosensitive elements of conventional type. The operator can thus be informed at all times of the angular error that exists between the current adjustment and the desired adjustment. In addition, such an improved device may be used to provide servocontrol of aim adjustment by using suitable adjustment motors.

Reference is now made to FIG. 2 which shows a device comprising an optical assembly 117 constituted by a transmitter 118 of a narrow light beam 119 and by an optical receiver (not referenced) which are in principle similar to those described with reference to FIG. 1. However, in this case the device 117 is not mounted on a reference bar but is associated with adjustable support means of any appropriate type (not shown) which are used to aim the transmitted beam 119 along a horizontal reference direction which is perpendicular to the longitudinal axis of the vehicle. To do this, use may be made, for example, of two reference plates 116 and 116' fixed to the vehicle each having a respective reference hole 116a and 116a' formed therethrough, with the two holes being situated on a horizontal straight line perpendicular to $A_L$. The optical device is positioned in such a manner that the beam 119 passes through both holes so as to take up its reference position.

In addition, means are provided for associating a plane mirror with each reflector, the plane mirror being oriented vertically and parallel to the optical axis defined by the reflector. One such mirror is referenced 112a for the left headlight.

In the same manner as in the example in FIG. 1, the aim of the reflector is adjusted by using a suitable optical receiver to ensure that the beam 119r reflected by the mirror 112a coincides with the transmitted beam 119. When the optical receiver is constituted by graduations, these may be disposed either on the optical device or else on the reference plates 116 and 116', for example.

Once the desired parallelism has been obtained by performing the adjustment, then the mirror 112a is parallel to the longitudinal axis of the vehicle and consequently its optical axis is likewise parallel to the vehicle axis.

The mirror 112a may be associated with the corresponding reflector by any appropriate means, for example:

the mirror 112a may include positioning pegs or the like enabling it to be removably and reproducibly positioned on some portion of the reflector, and preferably on the outside surface thereof and even more preferably near the top thereof;

the mirror 112a may be fixed to an item suitable for plugging into the lamp-receiving hole in the reflector, after the lamp has been removed; or the mirror 112a may be integrally molded with reflector, e.g. at the top thereof and made reflecting by conventional vacuum metallization techniques.

In the first and third possibilities, a flap or hatch may be provided in the headlight housing suitable for being opened at will to allow the plane mirror to project upwards.

To adjust the aim of the other headlight, the position of the optical device 117 is reversed and, where applicable, the reference mirror is fixed to the reflector of said other headlight.

A third basic embodiment of the present invention is now described with reference to FIGS. 3a and 3b.

A hole 212' is formed through the side of the headlight reflector 12' and is disposed in such a manner that the narrow light beam 219 formed by the radiation emitted by the filament F' and passing through this hole propagates in a direction which is accurately perpendicular to the optical axis defined by the reflector. A hole 210' is also formed through the side of the housing 10' and is disposed in such a manner as to allow the beam 219 to pass outside.

A plane reference mirror 201 occupying a vertical plane parallel to the longitudinal axis of the vehicle is fixed at a suitable location on the structure of the vehicle so as to intercept the light pencil 219 and reflect it.

In addition, a semi-reflecting plate 202 is disposed inside the housing 10' of the headlight between the holes 212' and 210', and is inclined, for example, at 45° relative to the optical axis $A_O'$ of the reflector 12'. This plate 202 is designed to pass the transmitted beam 219 but to reflect and deflect the reflected beam 219r as shown.

Finally, the glass 13' of the headlight includes a readout zone 213' in the form of a rectangular window which is elongated in a horizontal direction. This zone 213' is designed to avoid deflecting light rays and it carries a set of graduations.

This third type of device in accordance with the present invention behaves as follows: when the optical axis of the reflector 12' is not parallel to the plane of the mirror 201, i.e. to the longitudinal axis of the vehicle, then the transmitted beam 219 is not perpendicular to said mirror 201, and as a result the reflected beam 219r is offset at an angle to the transmitted beam 219. This offset is reproduced in the readout zone 213' by the semi-reflecting plate 202 with the reflected beam striking this zone at a location which is offset relative to its zero graduation.

In contrast, when the optical axis is aligned on a direction parallel to the longitudinal axis of the vehicle, then the mirror 201 reflects the incident beam through 180° and the plate 202 deflects the reflected beam to the graduation zero. The operator can thus establish that the desired adjustment has been achieved by reading the zone 213' integrated in the glass.

It may be observed that the geometry of the various items as shown diagrammatically in FIG. 3 merely constitutes one possible configuration for this embodiment of the invention. Specifically, the beam 219 could be transmitted along a direction which is not exactly perpendicular to the optical axis, but is merely essentially transverse thereto, with the disposition of the other items being modified accordingly.

FIG. 4 shows another basic embodiment of the present invention. The reflector 12,12' of each headlight includes a respective rectilinear reference mark 312,312' e.g. in its top surface, which reference mark is parallel to the optical axis of the reflector in question. Such a reference mark could be obtained, for example, by engraving in the mold used for making the reflector. It could also be applied by conventional marking techniques.

In this case, the indicator device includes a transverse bar 315 which is capable of being put in a reference direction, e.g. by being applied against two abutments 316a and 316b fixed to the structure of the vehicle and defining two reference points 315a and 315b. In the vicinity of each of its two ends, the bar 315 has respective rectilinear reference rods 314 and 314'. The bar 315, its two reference rods 314 and 314', and the two abutments 316a and 316b are designed and disposed in such a manner that when the bar is in its reference position, the rods are both exactly parallel to the longitudinal axis AL of the vehicle.

The bearing of each reflector is adjusted by maneuvering respective adjustment means until the associated rod is superposed over the reference mark provided on the reflector, thereby indicating that the optical axis of the reflector has been brought into parallelism with the longitudinal axis of the vehicle.

Particularly advantageously, each reflector not only has its reference mark parallel to the optical axis, but also has a series of angular graduations (referenced 312a, 312a') making it possible at all times to read out the angular error that remains between the current direction of the optical axis and the longitudinal direction of the vehicle as embodied by the associated rod.

Each of the reference rods situated outside the headlight housing may be superposed with the reference mark(s) provided on the associated reflector which is inside the housing by providing an access hatch in the top face of the housing, which hatch can be opened while performing the adjustment, or alternatively by providing a transparent window which enables the reference mark(s) to be observed from outside the housing, with the hatch and the window being omitted from the figures for reasons of clarity.

In a variant, the reference rods 314 and 314' of the bar 315 may be replaced by essentially horizontal transparent plates each including a central reference mark parallel to the longitudinal axis of the vehicle together with graduations suitable for showing the angular error between the central reference mark on the plate and the reference mark 312 or 312' on the reflector.

In order to be able to adapt the bar 315 to pairs of headlights that are spaced apart by differing distances, the bar may be designed to be adjustable in length, e.g. telescopically.

Finally, it may be observed that the bar 315 is not necessarily rectilinear and perpendicular to the longitudinal axis of the vehicle, the essential point is that when it is in its rest position on the abutments 316a and 316b, then its reference rods or marks are accurately positioned relative to the longitudinal axis.

Figure 5A:
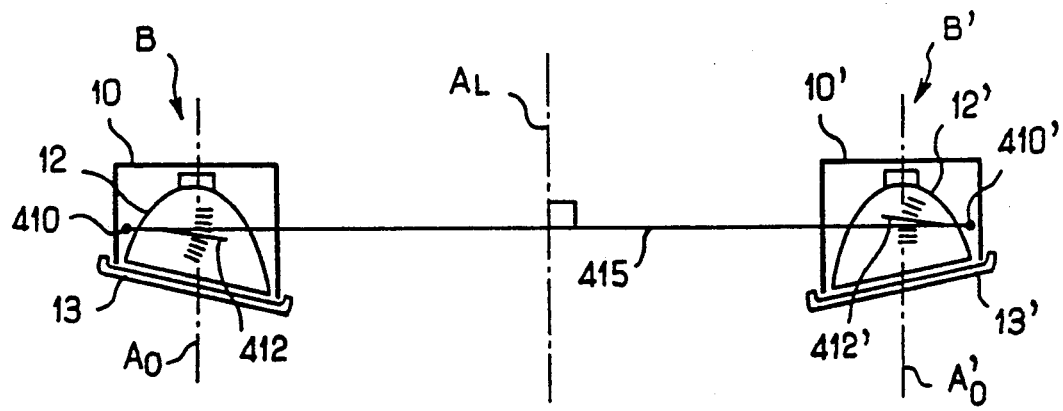
FIG. 5a is a diagrammatic plan view showing a fifth embodiment of an aim-indicating device of the present invention.
Figure 5B:
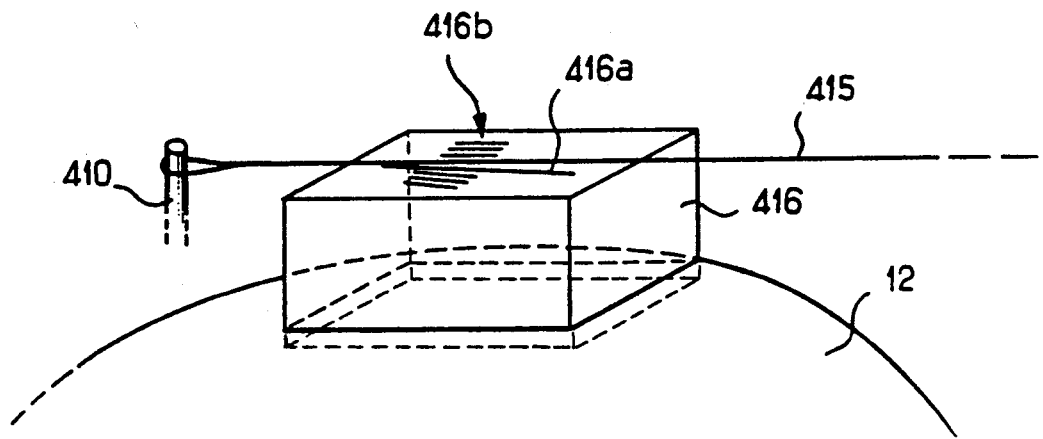

FIGS. 5a and 5b show a fifth basic embodiment of the invention. With reference initially to FIG. 5a, each reflector 12,12' has a respective rectilinear reference mark 412,412' disposed preferably on its top surface and extending accurately perpendicularly to the optical axis $A_O, A_O'$ of the corresponding reflector.

In addition, each headlight housing 10,10' which is mounted in fixed manner in the vehicle carries a respective peg 410,410' disposed in a well-determined location. A fine flexible cord 415 (e.g. of metal or other material) is tensioned between the two pegs, and the pegs are disposed in such a manner that when taut the cord is as accurately perpendicular as possible to the longitudinal axis $A_L$ of the vehicle.

Adjustment is performed by varying the bearing of each reflector using conventional adjustment means until the reference marks 412,412' are accurately in alignment with the cord 415. In this respect, by providing graduations on the top surface of the reflector on either side of the reference mark that is perpendicular to the optical axis, the operator can see at any instant the real angular error between the reference mark and the cord, which after transposition through 90° corresponds to the error between the optical axis of the reflector in question and the longitudinal axis $A_L$ of the vehicle.

As in preceding embodiment, in order to observe the reference mark provided on each reflector, the housing either includes either a hatch that can be opened or closed at will or else it includes a transparent observation window.

With this embodiment, it will be understood that there may be a considerable vertical distance between the reference mark with any graduations that may be associated therewithin on the reflector and the cord which is necessarily situated above the housing. It will be understood that this distance makes adjustment difficult. In order to mitigate this limitation, the invention provides a block 416 (see FIG. 5b) suitable for being installed between the cord 415 and the top surface of the reflector. The top surface of the block 416 includes a central reference mark 416a and a series of angle graduations 416b. In addition, the base of the block 416 and the top surface of the reflector are designed so that the block can be applied on said top surface in a position such that the central reference mark 416a is perpendicular to the optical axis of the reflector. For example, the base of the block may be received in a complementary depression provided in the top surface of the reflector.

The angular error between the optical axis of the reflector and the longitudinal axis of the vehicle is seen by observing the angular position of the cord 415 relative to the reference mark 416a and the graduations 416b on the top surface of the block.

Figure 6A:
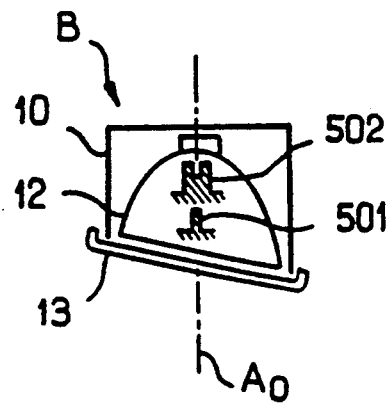
FIGS. 6a and 6b are diagrammatic plan views of a headlight and of the front of a vehicle with its hood raised, showing a sixth embodiment of a device of the present invention.
Figure 6B:
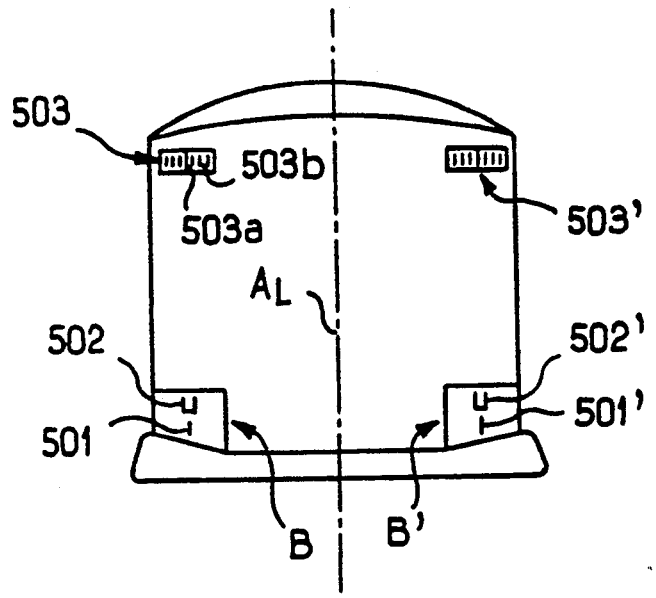

FIGS. 6a and 6b show a sixth embodiment of the present invention. In association with each optical block, the reflector includes (e.g. on its top surface) a sighting system essentially constituted by a front sight 501 and a back sight 502. Together these two sights define a direction which is parallel to the optical axis $A_O$ of the reflector.

In addition, a fixed location is provided on the vehicle behind the headlight in question for a target 503 which includes a zone having a central reference mark 503a together with lateral graduations 503b.

The back sight 502 and the central reference mark 503a are positioned in such a manner as to lie on a straight line parallel to the longitudinal axis of the vehicle.

The aim of the optical axis relative to the longitudinal axis of the vehicle can be read off by looking at the target 503 through the sighting system and observing which graduation is being aimed at. This gives the real angular error. Successive steps of adjusting the bearing and looking through the sighting system make it possible to move the sighting system so that it aims at the central reference mark 503a, thus indicating that the optical axis is parallel with the longitudinal axis of the vehicle.

Advantageously, and in order to prevent the reflector permanently having upwardly projecting portions such as the front and back sights, these items are mounted on a flap or on a pair of flaps hinged to the reflector and capable of being placed in a storage position once the aim has been adjusted.

Here again, a hatch or the like may be provided in the top face of the headlight housing 10 to allow the sighting system to project up and be seen in alignment with the target.

The graduated zones 503 and 503' are preferably disposed on the fire wall conventionally provided between the engine compartment and the passenger compartment of a vehicle.

In a variant of the embodiment of FIGS. 6a and 6b, it is possible to replace looking through a sighting system by tensioning a thin cord between the front sight and a location corresponding to the central reference mark 503a of the target, with the central or off-center position of the cord relative to the back sight indicating whether the bearing of the reflector aim is correct.

In addition, in particular to avoid any read-out error in the event of the vehicle being deformed due to an accident or the like, the embodiment shown in FIG. 6a and FIG. 6b, or the variant thereof, may be used to perform an angle error measurement not only in the longitudinal direction, as described above, but also diagonally.

Thus, when looking through the sighting system, each headlight may be provided with a second back sight or a second front sight in a position which is suitable for sighting the diagonally opposite target. If the headlight is properly centered relative to one of the two targets it must necessarily be properly centered relative to the other target, and if that is not the case, then there is a fault in the geometry of the vehicle, so that the readings are possibly wrong.

When sighting using a fine wire, it is possible to verify that the geometry of various components is correct either in the same manner as described above for visual sighting, or else by measuring and comparing the lengths of wire obtained when the wire is disposed in succession along both diagonals. A difference in length then indicates a defect of geometry that may cause the readings obtained to be erroneous.

It may be observed that embodiments of the types shown in FIGS. 1, 2, 4, 5a, and 5b may advantageously also be used each time a headlight aiming adjustment operation is performed to verify that the vehicle has not been subjected to deformation that could disturb the exactness of the aiming information obtained. For example, in the case shown in FIG. 5a, when preadjusting the aim of the two vehicle reflectors during manufacture, an operation may be performed consisting in making an indelible mark on a suitable location of the vehicle, e.g. halfway along the taut cord and immediately below the cord. On each subsequent occasion that headlight aiming is adjusted, it is possible to verify that the vehicle has not been subjected to accidental deformation and that the aiming measurements are thus valid by verifying that the mark is still immediately below the cord.

Conversely, in the event of deformation, the mark is no longer immediately below the cord, thereby indicating that the measurements are liable to error.

Figure 7:
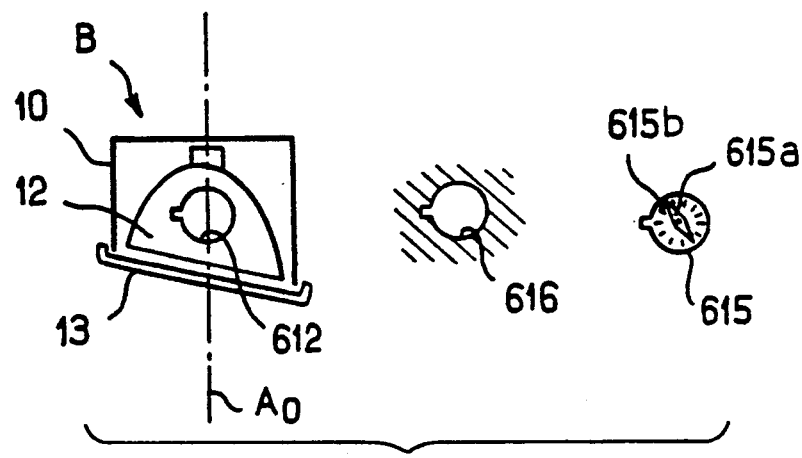
FIG. 7 is a diagrammatic plan view of a seventh embodiment of a device of the invention.

FIG. 7 shows a seventh basic embodiment of the invention. In this case, the device includes a compass 615. For example, each reflector 12 and 12' includes a respective compass housing 612,612' in its top surface, and the vehicle structure includes a similar housing 616. The housings are designed so that when a compass is received therein it takes up a well-determined and constant direction relative to the optical axis (for the reflectors) or relative to the longitudinal axis of the vehicle (for the housing on the vehicle structure).

By comparing the angle readings (position of the pointer 615a relative to graduations 615b) performed on the reflectors and also on the vehicle structure, it is possible to determine the angular error that exists between the optical axis of each reflector and the longitudinal axis $A_L$ of the vehicle merely by performing arithmetical subtraction.

In a variant embodiment (not shown) instead of using the Earth's magnetic field, it is possible to use a reference field generated by bringing a permanent magnet or a coil into the vicinity of the headlight in such a manner as to establish a field which is relatively uniform and of very well-determined direction relative to the longitudinal axis of the vehicle. A compass needle pivotally mounted on the top surface of each reflector and associated with graduations marked on said top surface can then be used to determine the angular offset between the optical axis of the reflector as embodied by the graduations and the longitudinal axis of the vehicle $A_L$ as embodied by the direction taken up by the compass needle.

A still further embodiment is illustrated in FIGS. 8 et sequa.

As in the previous embodiments, each headlight comprises a housing 10,10', a bulb 11,11' (not shown), a reflector 12,12' and a closure lens 13,13' (not shown).

The orientation indicating means basically comprise two members 710,710' adapted to be removably secured to the rear portion of the reflectors 12,12', respectively.

Figure 10:
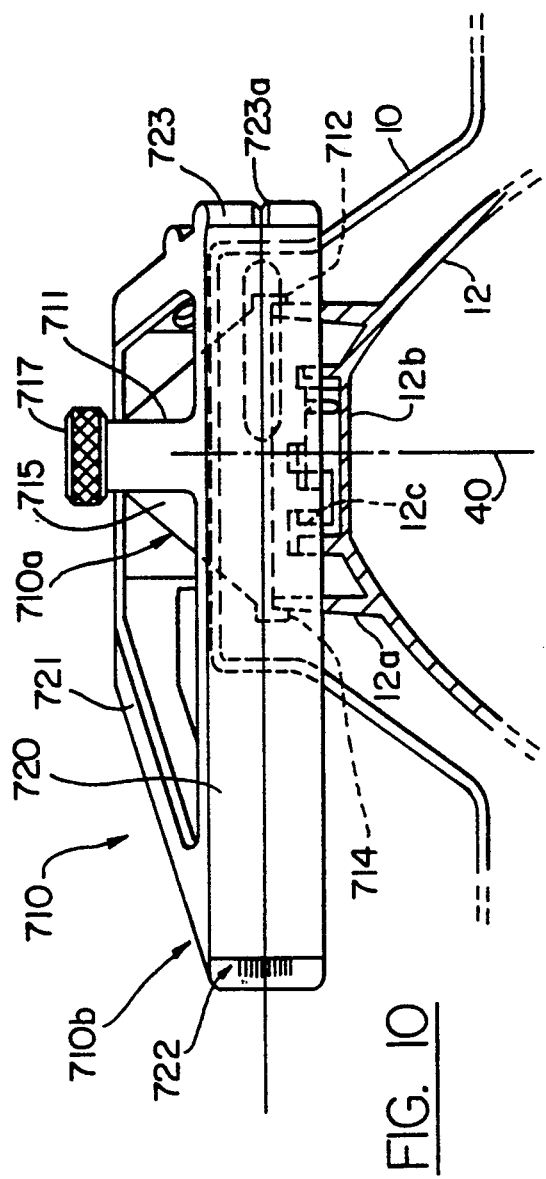
FIG. 10 is a top plan view of the indicated means shown in FIG. 9.

With particular reference to FIGS. 8-10, the member 710 associated to the headlight on the left side of the vehicle will now be described.

Such member comprises a body, for instance made of molded plastics, having a first portion 710a for securement to the rear of the reflector 12 and a second portion 710b for orientation indication. The first portion 710a has a central sleeve portion 711 and an external ring portion 712 defining a substantially annular surface 713 adapted to bear against the free rear end of a flange 12a protruding from the rear surface of reflector 12. The external portion 712 further includes a flange 714 adapted to surround the end region of reflector flange 12a for correct adjustment of said portion on said reflector flange 12a.

The central sleeve portion 711 and the external ring portion 712 are rigidly connected to each other via a plurality of arms 715 preferably integral therewith.

A threaded rod 716 extends within the sleeve coaxially therewith and is secured at one end to a knurled knob 717 which extends outside the sleeve 711. The opposite end of the rod 716 is threadably engaged in a corresponding threaded hole 718a formed in a clamping member 718 adapted for engagement with a lamp fixture 12c forming part of the reflector, adapted for the mounting of the lamp and securely arranged in a lamp hole 12b thereof.

The indicator portion 710b of member 710 includes a flat portion 720 which is connected to the securement portion 710a by means of a plurality of arms 721 (e.g. three ams) preferably made integral therewith. As best shown in FIGS. 9 and 10, portion 720 defines a flat elongated surface having at one end a series of graduation markings 722. At the opposite end, portion 720 has a rounded edge 723 having a rounded groove 723a made centrally therein.

Diagrammatically shown in 725 is a reel mechanism for a length of wire, preferably a relatively thin steel wire. The reel 725 is pivotally mounted on the arms 721 and has a return spring which tends to rotate the reel in the clockwise direction in FIG. 9 so as to keep the wire wound on the reel.

The wire 724 has a ball 724a or the like (shown in FIG. 11) at the free end thereof.

The member 710' associated with the right headlight on the vehicle is shown is FIG. 11 and is substantially identical to the one just described. The only difference lies in that the member 710' does not have the reel mechanism of member 710, but instead has a slot 726' in an arm 721' thereof, said slot having an upper narrow region 726a' and a lower widened region 726b' dimensioned so as to allow passage of the terminal ball 724a of the steel wire 724 (FIG. 11a). Besides, member 710' has the same features as member 710, indicated by the same reference signs to which a prime sign (') is added.

The mounting and utilization of the above-described indicator device will now be explained.

First of all, in each headlight, a rear closure member (not shown) of the headlight housing 10,10' is removed and the lamp of each headlight is dismounted if a lamp was previously mounted.

Each member 710,710' is then mounted at the rear of the respective reflector 12,12' which is accessible through the rear housing aperture.

The mounting of member 710 will now be described. The clamping member 718 is made to grip with the lamp fixture 12c and the knob is then manually rotated so as to pull member 710 towards the reflector until the bearing surface 713 of the ring is firmly pressed against the end region of the reflector flange 12a. In this manner, it is made sure that the orientation of member 710 relative to the reflector 12 is correct. Regarding the angular orientation of member 710, complementary shapings may be formed on the ring portion 713 and the end region of reflector flange 12a so as to allow correct seating only in the authorized angular relationship therebetween.

In this position, the top surface of portion, 720 is substantially flat, and the notional straight line extending from the groove 723a to the central mark of the graduations 722 makes a predetermined angle, preferably 90°, relative to the optical axis AO of the reflector 12.

The other member 710' is mounted at the rear of the other reflector 12' in the same manner.

Then the wire 724 is pulled by hand out of the reel 725 in member 710 and dragged towards the opposite member 710', and the terminal ball 724a is then manually inserted into opening 726b' and locked into the slot 726a'.

The return spring belonging to the reel mechanism 725 maintains the wire tensioned, so that said wire defines with a satisfactory accuracy an absolute reference direction on the vehicle (transverse direction).

The wire passes over the graduations 722 and 722' of members 710 and 710', respectively, and the position of the wire relative to said graduations indicates for each headlight the actual bearing of the reflector optical axis relative to the axial direction of the vehicle.

If the wire is in registration with the central mark of a graduation, this means that the reflector bearing is correct. If the operator observes an offset, then he actuates the bearing adjustment means (not described and of any suitable type) of the reflector, included in the respective headlight, so as to make the reflector pivot around a given vertical axis until the central mark comes into registration with the wire.

In the practical example of FIG. 12, the left reflector 12 (on the right of the figure) needs to be rotated clockwise through a given angle to attain correct bearing. The right reflector 12' (on the left of the figure) also needs a certain clockwise rotation.

After the adjustment has been made, wire 724 is stored again on reel 725, members 710,710' are dismounted and the respective lamps 11,11' may be placed in the lamp holes of the reflectors 12,12'.

In all of the embodiments described above, items are provided on the reflector 12 or 12', and in particular on the top surface thereof, for participating in establishing the aiming direction of the reflector.

However, all of these embodiments (other than that of FIGS. 3a and 3b) can be modified so that said items are not provided on the reflector itself but are provided on a removable intermediate support capable of occupying a well-determined position either in the reflector (after removing the lamp) or else against the outside surface of the reflector, e.g. at the back thereof. Such an intermediate support may thus carry an auxiliary mirror for optical measurement devices, graduations for devices that use a taut cord or a reference bar, or a sighting system for visual sighting devices.

Naturally, the present invention is not limited in any way to the embodiments described above and shown in the drawings, and the person skilled in the art will be able to make variations or modifications thereto in the spirit of the invention.

Thus, the various concrete solutions proposed by the present invention may be adopted either for adjusting reflectors only, as described, or else for adjusting headlights overall.

In addition, it should also be observed that all of the angular errors shown in the drawings are very considerably exaggerated for reasons of clarity. In practice, devices of the present invention are used to observe angular errors in the range a fraction of degree to a few degrees.

We claim:

1. In a motor vehicle pair of left and right headlights each comprising a housing and a reflector adjustably mounted in said housing for varying the aim of the optical axis of the reflector, a device for indicating the aim, at least in bearing of said optical axis relative to a longitudinal axis of the vehicle, wherein the device comprises:

a pair of members each comprising means for removable clamping on a reflector of each headlight of the vehicle, respectively, through an aperture of its respective housing, each member establishing the direction of the optical axis of each reflector, respectively, said members being distinct from beam generating surfaces of said reflectors;

a cord removably tensioned between said members and establishing a reference direction that is well determined relative to said longitudinal axis; and indicator means provided on each of said members for indicating the position of the optical axis direction relative to the reference direction.

2. A device according to claim 1, wherein said clamping means are adapted to cause a bearing surface thereof to be pressed against a terminal region of a respective reflector portion protruding rearwardly.

3. A device according to claim 2, wherein said clamping means engage a lamp hole of the respective reflector and said reflector portion is a collar surrounding said lamp hole.

4. A device according to claim 1, wherein one of said members has a spring-loaded reel mechanism on which said cord may be stored and the other member has a locking means for a free end of said cord when unwound from said reel.

5. A device according to claim 1, wherein each member has a flat member along which the cord extends and bearing said indicator means.

6. In a motor vehicle pair of left and right headlights each comprising a housing and a reflector adjustably mounted in said housing for varying the aim of the optical axis of the reflector, a device for indicating the aim, at least in bearing of said optical axis relative to a longitudinal axis of the vehicle, wherein the device comprises:

a pair of members each comprising means for removable clamping on the reflector of each headlight of the vehicle, respectively, through an aperture of its respective housing, said clamping means engaging a lamp hole of the respective reflector and causing a bearing surface of said clamping means to be pressed against a terminal region of a collar surrounding said lamp hole, each member establishing the direction of the optical axis of each reflector, respectively;

a cord removably tensioned between said members and establishing a reference direction that is well determined relative to said longitudinal axis; and indicator means provided on each of said members for indicating the position of the optical axis direction relative to the reference direction.

7. A device according to claim 6, wherein one of said members has a spring-loaded reel mechanism on which said cord may be stored and the other member has a locking means for a free end of said cord when unwound from said reel.

8. A device according to claim 6, wherein each member has a flat member along which the cord extends and bearing said indicator means.

* * * * *

UNITED STATES PATENT AND TRADEMARK OFFICE
CERTIFICATE OF CORRECTION

PATENT NO. : 5,283,956
DATED : February 8, 1994
INVENTOR(S) : Collot et al.

It is certified that error appears in the above-identified patent and that said Letters Patent is hereby corrected as shown below:

On the title page: Item [75]

Delete "Bobbigny" and substitute --Bobigny--.

Signed and Sealed this

Fourteenth Day of June, 1994

Attest:

BRUCE LEHMAN

*Attesting Officer*    *Commissioner of Patents and Trademarks*